(12) United States Patent
Lunkenheimer et al.

(10) Patent No.: US 7,470,317 B2
(45) Date of Patent: Dec. 30, 2008

(54) SUSPENSIONS

(75) Inventors: Rudolf Lunkenheimer, Wackenheim (DE); Hubert Dörrer, Limburgerhof (DE); Jochen Stein, Frankenthal (DE)

(73) Assignee: BK Giulini GmbH, Ludwigshafen (DE)

( * ) Notice: Subject to any disclaimer, the term of this patent is extended or adjusted under 35 U.S.C. 154(b) by 0 days.

(21) Appl. No.: 10/528,798

(22) PCT Filed: Aug. 21, 2003

(86) PCT No.: PCT/EP03/09256

§ 371 (c)(1),
(2), (4) Date: May 15, 2006

(87) PCT Pub. No.: WO2004/018380

PCT Pub. Date: Mar. 4, 2004

(65) Prior Publication Data

US 2006/0249055 A1    Nov. 9, 2006

(30) Foreign Application Priority Data

Aug. 23, 2002  (DE) ................. 102 38 789

(51) Int. Cl.
C04B 22/14 (2006.01)
C04B 40/00 (2006.01)

(52) U.S. Cl. .............. 106/286.5; 106/287.17; 106/287.32; 106/486; 106/801; 106/811; 106/815; 106/819

(58) Field of Classification Search ........ 106/486, 106/815, 819, 286.5, 287.17, 287.32, 801, 106/811
See application file for complete search history.

(56) References Cited

U.S. PATENT DOCUMENTS

| | | | | |
|---|---|---|---|---|
| 4,069,062 A | * | 1/1978 | Burge | 106/803 |
| 4,359,339 A | * | 11/1982 | Van Fisk, Jr. | 106/38.3 |
| 4,883,536 A | * | 11/1989 | Burdick | 106/162.82 |
| 5,935,318 A | | 8/1999 | Angelskar et al. | |
| 6,537,367 B2 | | 3/2003 | Sommer et al. | |

FOREIGN PATENT DOCUMENTS

| | | | |
|---|---|---|---|
| EP | 620190 A1 | * | 10/1994 |
| EP | 0675089 | | 10/1995 |
| EP | 812812 | | 12/1997 |
| EP | 0 858 981 A1 | | 1/1998 |
| JP | 01045754 | | 2/1989 |
| JP | 11240742 | | 9/1999 |
| SU | 956529 A | * | 9/1982 |

OTHER PUBLICATIONS

Translation of Applicants' Response to European Office Action, no date.
"Chemical Oxygen Demand (COD) is the Measurement of the Amount of Oxygen in Water Consumed for Chemical Oxidation of Pollutants", www.water-technology.net, no date.
"Chemical Oxygen Demand", http://en.wikipedia.org/wiki/Chemical_oxygen_demand, no date.
www.hannainst.com.au/Pro/what_is_cod.htm [Jan. 19, 2007].
www.google.com/search?hl=en&q=define%3A+COD&btnG=Google+Search, no date.
International Preliminary Examination Report for International Application No. PCT/EP2003/009256 [Apr. 28, 2004].

* cited by examiner

*Primary Examiner*—Anthony J Green
(74) *Attorney, Agent, or Firm*—Venable LLP; Keith G. Haddaway

(57) ABSTRACT

The invention relates to suspensions, to the production of said suspensions, and to the use thereof for accelerating the setting and hardening of cement and mixtures containing the same. According to the invention, said suspensions consist of aluminium sulphate in a quantity of more than 8 wt. % as $Al_2O_3$, preferably between 10 and 12 wt. %, and of suspended bentonite in a quantity of between 1 and 7 wt. %. Said suspensions can especially be used as economical and ecological alternatives in the field of wet spraying. The inventive suspensions are free of COD and alkali.

4 Claims, No Drawings

SUSPENSIONS

The present invention relates to suspensions, the production of said suspensions, as well as their use for accelerating the setting and hardening of cement and mixtures containing cement.

Agents for accelerating the setting and hardening of cement have long been known and are used in various fields, wherein gunned concrete or gunite in particular is worth mentioning.

Since gunned concrete must set quickly to guarantee maximum safety and a smooth operation, for example in tunnel construction, accelerators are used for accelerating the setting.

For work hygienic reasons and considering concrete technology, classic alkaline setting accelerators such as sodium aluminate and liquid glass are used less and less often. Alkaline accelerating agents are highly caustic and thus dangerous to the health. They reduce the final concrete strength and force shrinkage which can lead to an increase in the crack formation. The alkaline metals contained in these accelerators can leach out, thereby leading to pollution of ground water and drinking water and increased encrustation of drainage systems.

Alternative materials, primarily on the basis of aluminum sulphate and aluminum hydroxy sulphates (alkaline aluminum sulphates), are commercially available. Aluminum sulphate is quite suitable as accelerating agent for the setting and has the great technical advantages of being available in liquid form. However, as a result of the low water solubility of aluminum sulphate of approximately 8 weight % in the form of $Al_2O_3$, large amounts of aluminum sulphate solution would be required to ensure that the above-listed requirements for a setting and hardening accelerator are met. The concrete would consequently contain large amounts of water, especially when used for the wet spraying method, which would then lower the compression strength.

The disadvantage of liquid setting accelerators with higher concentrations is that these accelerators contain organic components which stress the environment with COD-containing substances that can leach out of the concrete. Used are carbonic acids and alkanolamines and above all diethanolamine which is damaging to organisms in the water.

A further disadvantage is the high cost of these products, caused by an involved production and/or high raw-material costs. The above-described accelerators are commercially available in the form of powders as well as liquids (solution or suspension), wherein the liquid products are always preferable to the powders because of the better metering ability, a more homogeneous distribution, and a quicker release of the effective substance.

References EP 0 812 812 A1 and U.S. Pat. No. 5,935,318 describe an accelerating additive for cement-type compounds, which contains aluminum sulphate that is mostly free of aluminum hydroxide as well as at least one alkanolamine. The accelerating additive can also contain a stabilizer, selected from polymer dispersions or sepiolite.

Reference EP 0 858 981 A1 claims a setting and hardening accelerator containing aluminum salt, preferably $Al_2(SO_4)_3$, characterized in that it contains a) an amorphous silicic acid and b) an inorganic and/or organic thixotroping agent and/or an organic carbonic acid ester. This accelerator of necessity requires at least three components, wherein organic as well as inorganic thickening agents are used to keep the amorphous silicic acid in a state of suspension. Organic thickening agents are described herein for the examples, wherein bentonite is also mentioned as inorganic thickening agent. The examples in this patent furthermore disclose that the aluminum salt concentrations, expressed as $Al_2O_3$, are noticeably lower than 8 weight %, so that relatively large amounts of the accelerating solution are required, thus resulting in a negative effect on the water/cement ratio.

It is the object of the present invention to provide the marketplace with a setting and hardening accelerator in liquid form which is completely or nearly free of COD-containing substances and which is highly effective.

Surprisingly, this object could be solved by providing suspensions characterized in that they contain aluminum sulphate in amounts higher than 8 weight %, in the form of $Al_2O_3$, and suspended or dispersed bentonite in amounts of 1 to 7 weight %. In contrast to the above-cited products according to prior art, these suspensions do not contain alkanolamines, amorphous silicic acid, or organic thixotropic agents.

The term suspensions must be understood to refer to systems composed of several phases, one of which is continuous while at least one other one is finely dispersed. The finely dispersed phase contains primarily solid particles having a particle size of less than 100 μm, preferably less than 70 μm.

The suspensions are produced by means of a method which is characterized in that aluminum sulphate, present in part in solid form, is stirred together with bentonite into water at increased temperatures, preferably at temperatures of up to 100° C., so that a suspension is produced.

The term aluminum sulphate is understood to include compounds based on the formula: $Al_2(OH)_x(SO_4)_y \cdot zH_2O$, wherein z=0 to 18 and preferably 10 to 16, y>1.5, and x=6−2y.

The aluminum sulphate is used in amounts above 8 weight % to 15 weight %, in particular in amounts of 10 to 12 weight %, relative to the $Al_2O_3$.

Ca-, Ca/Na- and Na-bentonite are preferably used for the bentonite, wherein these can be dispersed in water, particularly in amounts ranging from 2 to 6 weight %.

The suspensions are produced by filling water into a reactor provided with a stirrer and by stirring aluminum sulphate in solid form and bentonite into the water to create a homogeneous suspension with both components at room temperature, preferably at an increased temperature. In the process, a large share of the aluminum sulphate dissolves while the rest is then present in the form of a suspension. The suspended shares are stabilized by the bentonite with respect to sedimentation.

One preferred method is characterized in that in a first step bentonite is suspended in an aluminum sulphate solution and that solid aluminum sulphate is then added in a second step to this suspension. The resulting suspension is then homogenized at an increased temperature, wherein the temperature in this case does not exceed 100° C.

According to one preferred embodiment, the suspension is produced in that bentonite is stirred by means of a toothed disk into a starting solution of aluminum sulphate, having an $Al_2O_3$ content of approximately 8 weight % at room temperature. The resulting mixture is then heated to 30 to 35° C. and the remaining aluminum sulphate is stirred in with a high shear drop in the form of a solid material. The suspension is then heated to 70° C., is stirred for another 15 to 120 minutes with the toothed disk, and is subsequently allowed to cool down.

Temperatures above 100° C. can be used for producing these suspensions. However, for energetic and system-technical reasons it makes sense to use only temperatures ranging up to 100° C.

The final product contains aluminum sulphate, expressed as $Al_2O_3$, in amounts exceeding 8 to 15 weight %, preferably 10 to 12 weight %, as well as bentonite in amounts of 1 to 7 weight %, preferably 2 to 6 weight %. (All concentrations listed in percentages must be understood to be weight percentages.)

The suspensions according to the invention are especially suitable for accelerating the setting and hardening of cement and mixtures containing cement. These suspensions are used especially for shot mortar and gunned concrete, using either the dry or wet spraying method, wherein the suspensions are preferably used in the range of 1 to 15%, relative to the bonding agent.

The following examples describe in further detail the subject matter of this invention without restricting it.

Production

EXAMPLE 1

A starting amount of 535.5 g water is filled into a 1.2 liter double-shell reactor equipped with a stirrer and 60 g bentonite is stirred in. Stirred into this mixture is 904.5 g solid aluminum sulphate with an $Al_2O_3$ content of 17% and a sulphate content of 47%. The reactor is heated to 58° C., the mixture is stirred for 60 minutes at this temperature and is then allowed to cool down. The resulting suspension has a Brookfield viscosity (DV-II, 20° C., 60 RPM) of 900 mPas, COD: 160 ppm.

EXAMPLE 2

A starting batch of 134.4 kg aluminum sulphate solution, having an $Al_2O_3$ content of 8% and a sulphate content of 21.1%, is placed into a 200 liter reactor equipped with toothed disk and 9 kg bentonite is then stirred in. The mixture is heated up to 33° C. and 56.6 kg solid aluminum sulphate with an $Al_2O_3$ content of 17% and a sulphate content of 47% is added. The reactor content is stirred for another 100 minutes at 51 to 59° C. and is then allowed to cool down. The resulting suspension has a pH value of 2.4 and a Brookfield viscosity (DV-II, 20° C., 60 RPM) of 850 mPas, COD: 170 ppm.

Examples for Technical Applications:

Vicat Test:

The setting times were determined based on the Vicat method and according to DIN EN-196-3. Used were 300 g cement and 3 g liquefier (1%). The water/cement value amounted to 0.31. The cement glue was accelerated following a residence time of 10 minutes.

Used for the comparison was a commercially available suspension (Meyco SA 160, MBT—Switzerland) with an $Al_2O_3$ content of 10.3 weight % and a COD content of 99 g/kg. A shown in Table 1, the suspensions according to the invention have advantages as compared to the commercially available suspension when the Vicat test is used.

COMPARISON EXAMPLES

Since the examples in reference EP 0 858 981 A1 do not list any amounts, the corresponding amounts of the substances were selected based on the information provided in the patent claims and the specification.

According to claim 4 of the EP 0 858 981 A1, the amorphous silicic acid content must be at least 5 weight %. According to the statement in line 55 on page 2, the setting accelerator can contain up to 5 weight % of bentonite.

Furthermore, no organic auxiliary agents were used to avoid adding any COD-containing agents to the setting accelerator. Thus, based on the teaching in this patent, COD-free and/or nearly COD-free setting and hardening accelerators were produced. Of necessity, these must contain three substances.

The following starting compounds were used:
1. Commercially available, saturated aluminum sulphate solution having an $Al_2O_3$ content of 8 weight % and a sulphate content of 21.2 weight %.
2. Sipernat 570 (Degussa) in the form of amorphous silicic acid.
3. Ca/Na bentonite.

Comparison Example 1

The amounts of 5 g amorphous silicic acid and 2.25 g bentonite are stirred successively into 92.75 g aluminum sulphate solution and the resulting suspension is stirred for 1 hour.

Comparison Example 2

The amounts of 5 g amorphous silicic acid and 4.5 g bentonite are stirred successively into 90.5 g aluminum sulphate solution and the resulting suspension is stirred for 1 hour.

Comparison Example 3

The amounts of 10 g amorphous silicic acid and 2.25 g bentonite are stirred successively into 87.75 g aluminum sulphate solution and the resulting suspension is stirred for 1 hour.

TABLE 1

Effect of suspensions according to the invention on the setting time.

| Suspension of | Concentration for cement | Type of cement | Start of setting time (min.) | End of setting time (min.) |
| --- | --- | --- | --- | --- |
| Example 1 | 8% | CEM I | 2.5 | 12.5 |
| Example 1 | 8% | CEM II | 5.5 | 15 |
| Example 2 | 8% | CEM I | 2.5 | 10 |
| Comparison | 8% | CEM I | 3.5 | 15.5 |
| Comparison | 8% | CEM II | 9.5 | 19 |

TABLE 2

Effect of the suspensions according to the invention on the setting times.

| Suspension of | Concentration of cement | Type of cement | Start of setting time (min.) | End of setting time (min.) |
| --- | --- | --- | --- | --- |
| Example 2 | 8% | CEM I | 1.5 | 7 |
| Comparison Example 1 | 8% | CEM I | 9.5 | 26 |
| Comparison Example 2 | 8% | CEM I | 6.5 | 25.5 |
| Comparison Example 3 | 8% | CEM I | 5.3 | 20 |

Table 2 shows that the suspension according to the invention is clearly superior to the suspensions in the comparison examples according to reference EP 858 981 A1.

Stabilities

The stabilities were tested on the basis of DIN 1164, Part 7. The following modifications were made in the process:

Loading: 0 to 8 mm
Water/cement value: 0.48
liquefier: 1%
Admixture of accelerator: 60 minutes after concrete production
Cement: 420 kg/m$^3$
Accelerator: 8% with respect to cement

TABLE 3

Effect of the suspensions according to the invention on the early and final stabilities
Compression strengths in N/mm$^2$ according to

| Suspension of: | Cement type | 2 h | 6 h | 24 h | 168 h | 672 h |
|---|---|---|---|---|---|---|
| Example 2 | CEM I | 1.4 | 11 | 43 | 65 | 75 |
| Example 2 | CEM II | 1.1 | 4.2 | 35 | — | — |
| Comparison | CEM I | 1.3 | 12 | 44 | 61 | 70 |
| Comparison | CEM II | 1 | 4.7 | 37 | — | — |

A commercially available suspension (Meyco SA 160, MBT—Switzerland), having an Al$_2$O$_3$ content of 10.3 weight % and a COD content of 99 g/kg is used for the comparison. Table 3 shows that the effect of the suspensions according to the invention is comparable to the effect of the commercially available suspension loaded with COD.

The invention claimed is:

1. A method for producing suspensions comprising aluminum sulphate ranging from 10 to 12 weight % in the form of Al$_2$O$_3$ and 2 to 6 weight percent bentonite, wherein the method comprises stirring aluminum sulphate in the presence of bentonite in water, at temperatures ranging from 30 to 100° C., and forming a homogeneous suspension comprising aluminum sulphate in amounts of 10 to 12 weight % in the form of Al$_2$O$_3$, and dispersed bentonite in amounts of 2 to 6 weight %.

2. A method for producing suspensions comprising aluminum sulphate ranging from 10 to 12 weight % in the form of Al$_2$O$_3$ and 2 to 6 weight percent bentonite, wherein the method comprises stirring bentonite in an aluminum sulphate solution to form a first suspension; and a second step comprising stirring solid aluminum sulphate in said first suspension at temperatures, ranging from 30 to 100° C. to form a homogeneous suspension comprising aluminum sulphate in amounts of 10 to 12 weight %, expressed on a Al$_2$O$_3$ basis, and dispersed bentonite in amounts of 2 to 6 weight %.

3. A method of claim 2, wherein the suspension are free of COD containing sources.

4. A cement containing composition comprising a mixture of cement and a hardening accelerator, which is free of COD containing sources, which hardening accelerator comprises an aqueous suspension comprising aluminum sulphate in water, in amounts ranging from 10-12 weight %, expressed on an Al$_2$O$_3$ basis, and dispersed bentonite in amounts of 2 to 6 weight %.

* * * * *